April 19, 1966 M. R. KARECKI 3,246,534

DRIVE MECHANISM FOR TAPE RECORDERS

Filed Nov. 12, 1963 2 Sheets-Sheet 1

INVENTOR.
Marion R. Karecki
BY
Brown, Jackson, Boettcher & Dienner
Att'ys

April 19, 1966 M. R. KARECKI 3,246,534

DRIVE MECHANISM FOR TAPE RECORDERS

Filed Nov. 12, 1963 2 Sheets-Sheet 2

INVENTOR.
Marion R. Karecki
BY
Brown, Jackson, Boettcher & Dienner
Attys.

United States Patent Office 3,246,534
Patented Apr. 19, 1966

3,246,534
DRIVE MECHANISM FOR TAPE RECORDERS

Marion R. Karecki, St. Joseph, Mich., assignor to V-M Corporation, Benton Harbor, Mich., a corporation of Michigan Filed Nov. 12, 1963, Ser. No. 322,898
3 Claims. (Cl. 74—217)

The present invention relates to a tape drive mechanism for tape recorders. More specifically, the invention relates to a novel belt and pulley arrangement for driving the flywheel and capstan of a tape recorder so as to provide an improved drive means for feeding tape from a supply reel over a magnetic head and to a take-up reel during a playback or recording operation.

It is conventional in the design of commerical tape recorders to provide a flywheel which is operatively associated with a motor shaft so as to be driven thereby and which carries a drive shaft or rod known as a capstan for engaging and feeding tape from a supply reel across a magnetic head and then to a take-up reel. The capstan is coaxial relative to the flywheel and is fixedly associated with the flywheel so as to rotate therewith, and a pressure roller or the like is provided to press the tape against the capstan in order that the latter will drive the tape at a predetermined constant speed. Additional drive mechanism is customarily provided for rotating the take-up reel during playback or record, and for rotating the supply reel during rewind, but the critical speed of the tape during playback or record is controlled by the speed of rotation of the capstan and flywheel assembly, and slippage is generally provided for in the drive of the take-up reel so that the latter will adjust itself to the speed of the tape.

In one known form of multi-speed tape recorder a plurality of drive pulleys of different diameters are formed side-by-side as an integral stepped pulley unit and such unit is mounted on a motor shaft so as to serve as a driving member for the other rotatable components of the tape recorder. Thus, in such systems an endless drive belt is extended around the periphery of the flywheel and over one of the drive pulleys for driving the flywheel at a predetermined speed. There may also be provided a belt lifter member for shifting the belt from one drive pulley to another of a different diameter so as to drive the flywheel at a different predetermined speed. The endless drive belt may be wrapped around the periphery of the flywheel, or around a hub formed on the flywheel, although in either instance it is desirable that the belt extend around a flat cylindrical surface so as to permit the belt to move axially relative to the flywheel and thereby align itself with the particular drive pulley on which the belt is mounted in accordance with the desired speed of the drive mechanism.

In known tape recorders of the type described above, it is customary to provide an O-ring belt of circular cross section in order to drive the flywheel from one of the drive pulleys on the motor shaft. The drive pulleys are customarily provided with grooves for receiving the endless O-ring belt, and of course the belt is adapted to extend around a selected drive pulley and around the cylindrical surface of the flywheel without any appreciable twist or the like.

I have discovered that certain disadvantages are caused by the use of O-ring belts in tape recorder applications of the type described above unless extreme care is used in the manufacture of the belts. Such disadvantages are produced by flash lines such as are normally associated with molded O-ring belts. Flash lines have been found to cause slight variations in the speed of rotation of the flywheel resulting in certain undesirable audible effects during playback commonly known as "wow" and "flutter."

While there are various methods for molding O-rings, it is common to form a blank of suitable dimensions and then to place the blank on the base of a molding die, after which the ram or upper portion of the molding press is moved against the base so as to squeeze the blank compound into annular grooves, portions of such grooves being formed in the base and also in the upper portion of the molding press. It will readily be understood that in the carrying out of such a molding process the excess material will flow out of the annular grooves at the parting line of the molding press so as to form flash lines at the outside and at the inside of the O-ring. Various procedures are commonly utilized to remove such flash. A major portion of the flash is removed by die trimming followed by tumbling with various polishing agents, but a very careful hand buffing operation is generally required in order to remove substantially all of the flash from the O-rings.

I have discovered that if the flash is not completely removed from the O-rings, high spots on the O-ring belt will cause slippage and slight speed variations resulting in the above-mentioned effects such as "wow" and "flutter" which are highly objectionable in a commercial tape recorder. In addition, the procedures for removal of flash such as die trimming, tumbling and hand buffing are quite expensive and add considerably to the cost of the drive belt.

Accordingly, it is an object of the present invention to provide an improved belt and pulley arrangement for driving the flywheel and capstan of a tape recorder so as to overcome the above-described disadvantages and also substantially reduce the cost of the tape recorder drive mechanism.

In furtherance of the foregoing object I provide a stepped pulley having V-grooves formed therein which is mounted on a motor drive shaft, and in combination therewith I provide a large diameter flywheel having a generally cylindrical surface. The flywheel is driven by means of an endless belt which is substantially square in its cross sectional configuration and which extends around the periphery of the flywheel and over one of the drive pulleys so as to rest in the V-groove formed therein. A belt lifter is provided to shift the belt from one of the drive pulleys to another to vary the speed, and the cylindrical surface of the flywheel is substantially flat to permit the belt to move axially thereon so as to align itself with the particular drive pulley on which the belt is carried.

It is important to understand that the sides of the V-groove in a drive pulley preferably define an angle of approximately 90 degrees, and the square belt fits snugly within such groove with two of its sides in engagement with the respective sides of the groove. One the other hand, as the belt extends around the flat peripheral surface of the flywheel, one of the sides of the belt lies substantially flat on the flywheel surface. Consequently, in a drive system in accordance with a preferred embodiment of the present invention, the belt assumes a quarter twist of approximately 45 degrees between the flywheel and the stepped motor pulley. In addition, the square belt can be cut on a lathe so that no flash is produced, and tests have shown that the foregoing drive arrangement provides substantially improved results with respect to the elimination of "wow" and "flutter" and the like.

Other advantages and uses of my invention will be apparent, or become so, as I describe my invention in greater detail in conjunction with the accompanying drawings in which.

Figures 1, 2:
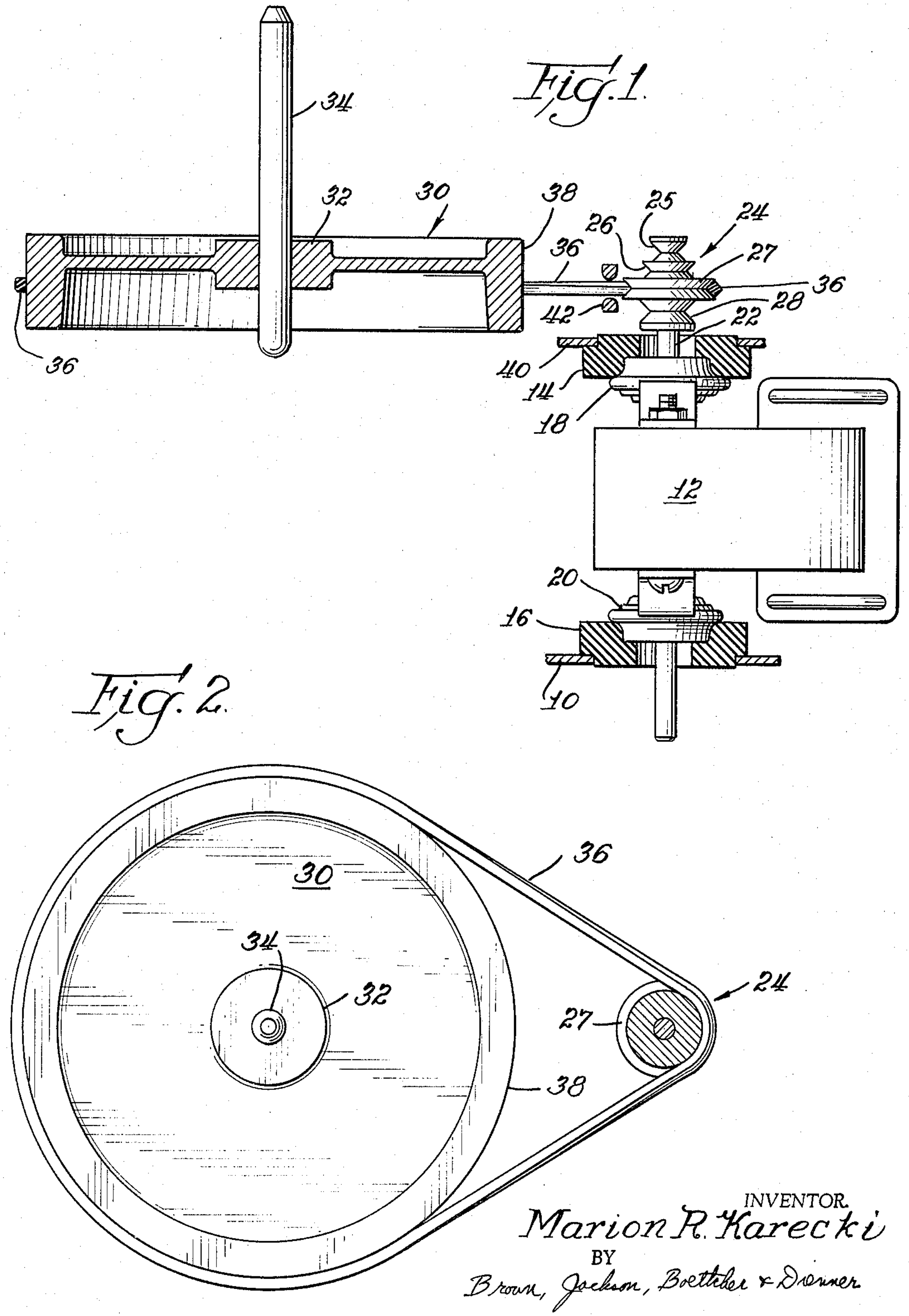
FIGURE 1 is a vertical sectional view showing a flywheel drive for a tape recorder constructed in accordance with the principles of the present invention.
FIGURE 2 is a top plan view, partly in section, of the flywheel drive of FIGURE 1.

Referring now to the drawings, FIGURES 1 and 2 show a motor bracket 10, a motor 12, a pair of motor grommets 14 and 16, a pair of bearings 18 and 20, a motor shaft 22, and a stepped pulley indicated generally at 24. The stepped pulley 24 is fixedly carried on the upper end of the motor shaft 22 and is provided with three vertically spaced V-grooves 25, 26 and 27 of varying diameters in order to provide for a variable speed flywheel drive. A fourth V-groove 28 is also provided and may be used as a power take-off for driving the supply and take-up reels of a tape recorder with which such drive mechanism is intended to be associated. There is also shown a flywheel 30 having a central hub portion 32 which is apertured to receive a capstan 34. The capstan is coaxial with respect to the flywheel and is fixedly associated with the flywheel for rotation therewith. The flywheel 30 is rotatably mounted in any suitable manner, and an endless belt 36 is extended around the periphery 38 of the flywheel and around the stepped pulley 24 so as to provide a drive connection therebetween. There is further shown a fragmentary portion of a plate 40 which may if desired be utilized as a mounting plate to support both the motor 12 and also the flywheel 30.

It will be understood that the above-described drive mechanism is intended for use in a tape recorder wherein during playback or record the capstan 34 will serve to drive the tape from a supply reel over a magnetic head and then to a take-up reel. As is conventional in such systems, the tape may be pressed against the capstan 34 by a pressure roller or the like so as to enable the capstan to drive the tape at a constant predetermined speed, and additional drive means may be provided for rotating the take-up reel at an appropriate speed. It will thus be seen that during playback or record the tape speed will be determined by the speed of rotation of the assembly of the flywheel 30 and the capstan 34 which rotates therewith, and it is therefore extremely important that the flywheel be driven at a constant predetermined speed without any inaccuracy or fluctuation of any kind.

It will be readily understood that mounting means for rotatably mounting a flywheel, and pressure roller means for pressing the tape against a drive capstan, are well known in the art, as are supply reels and take-up reels and a magnetic head disposed therebetween, and thus such mechanism will not be further described herein. Reference may be had to the copending application of Robert B. Rhoades, Serial No. 207,215, filed July 3, 1962, now abandoned, and assigned to the assignee of the present invention, for a further description of such known tape recorder mechanism.

A belt lifter member 42 is shown schematically in FIGURE 1 and is provided for the purpose of shifting the belt 36 from one of the V-grooves 25, 26 and 27 to another thereof for varying the speed of the flywheel 30. Thus, the belt lifter 42 may be associated in known manner with a manually operable knob located at the control panel of a tape recorder so as to provide a variable speed drive for the flywheel, it being understood that the movement of the member 42 is up and down as viewed in FIGURE 1.

Figure 3:
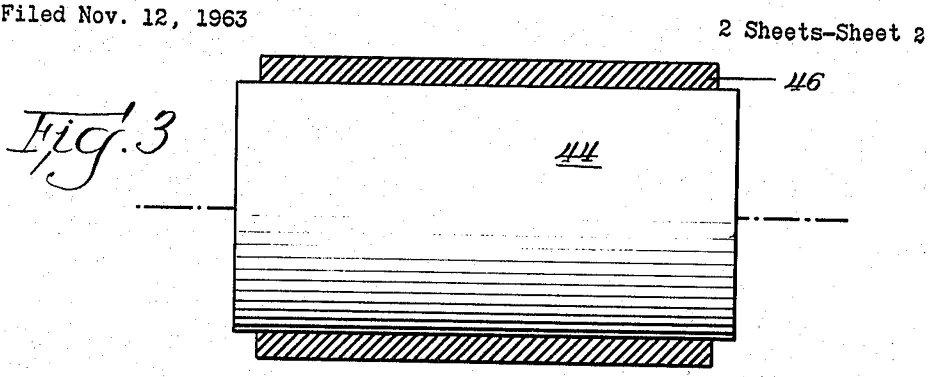
FIGURES 3–5 are vertical sectional views which illustrate somewhat schematically the various operations required in the manufacture of a square belt of the type which comprises a component of the flywheel drive of FIGURE 1.
Figure 4:
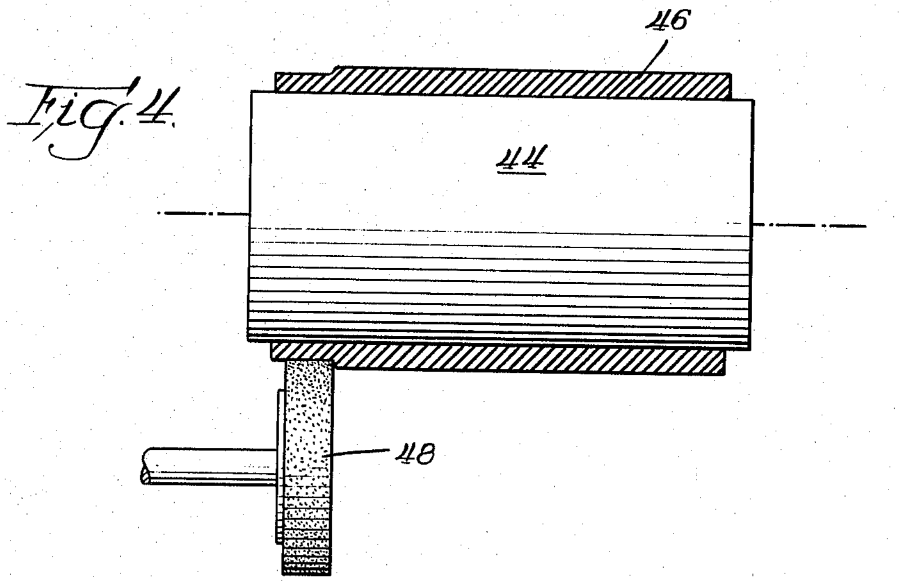
Figure 5:
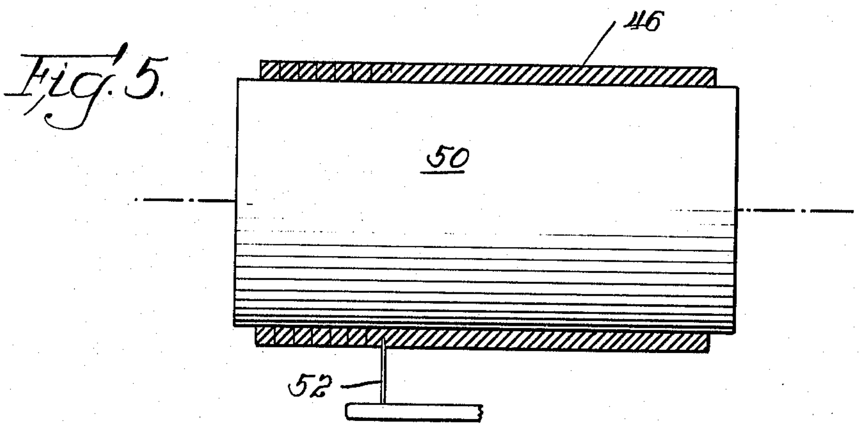

Referring now more specifically to the endless belt 36, such belt is approximately square in its cross sectional configuration, and it may be produced by a lathe cutting operation so as to avoid the production of flash lines as in the case of molded O-ring belts. Thus, FIGURE 3 shows a vulcanizing mandrel 44 on which belt compound 46 is vulcanized and cured. The outside diameter of the resulting sleeve molding 46 is next rough ground and then smooth ground as indicated in FIGURE 4 where a grinding wheel is shown at 48. After the grinding operation the sleeve molding 46 is removed from the vulcanizing mandrel 44 and mounted on a cutting mandrel 50 as shown in FIGURE 5, after which a knife edge tool 52 of any desired type may be utilized to cut the belt to a desired width.

It is important to note that when the square belt 36 is applied over the flywheel 30 and the stepped pulley 24, the belt assumes a quarter twist of 45 degrees between the flywheeel and the pulley. The periphery 38 of the cylindrical flywheel 30 is preferably flat so that the belt 36 can move axially on the flywheel to align itself with a selected one of the V-grooves 25, 26 and 27 in accordance with the position of the belt lifter member 42. That is, when the belt lifter 42 is positioned so as to place the belt on a selected one of the V-grooves, in order to provide for a predetermined speed, the belt on the periphery of the flywheel will automatically align it with the selected V-groove.

It will be understood from the foregoing that the four-sided square belt 36 will wrap around the peripheral surface 38 of the flywheel so that one of the sides of the belt will lie substantially flat on the flywheel surface. On the other hand, the portion of the belt which is positioned in a V-groove such as shown at 27 in FIGURE 1 will be oriented so that two of its sides will engage against corresponding sides of the groove, thus accounting for the fact that the belt must always assume a 45 degree twist between the flywheel and the stepped pulley.

I have found that the foregoing flywheel drive arrangement provides numerous important advantages over the conventional belt drive for a tape recorder flywheel. Initially, it may be noted that the cost is much less since the vulcanizing, grinding and cutting operations described hereinabove are far less expensive than the various molding, tumbling and hand buffing operations required in the production of a conventional O-ring belt. I have determined that unless the molded O-ring belts are hand buffed with great care to remove all flash, the flash lines on such belts will result in speed variations in the flywheel drive resulting in "wow" and "flutter," as explained earlier herein. On the other hand, it has been found that the use of a square or rectangular lathe cut belt in such applications will substantially overcome these problems. Another problem encountered with a conventional O-ring belt is that when such a belt is extended around a flywheel and a pulley as in FIGURE 1, the belt will tend to spiral slowly when the drive is operating, and high spots will cause slippage or otherwise produce slight speed fluctuations, whereas the four-sided square belt eliminates any such spiral effect.

As indicated above, the four-sided belt 36 is preferably approximately square in its cross sectional configuration. That is, with reference to FIGURE 1, as to each of the two sides of the belt which engage against the respective sides of the V-groove in the drive pulley, it is preferable that the area of contact be approximately equal in each case, and it is also preferable that the belt not overlap the radially outer edge at either side of the V-groove.

While I have illustrated my invention in a preferred form, I do not intend to be limited to that form, except insofar as the appended claims are so limited, since modifications coming within the scope of my invention will be readily suggested to others with my disclosure before them.

I claim:

1. In a tape recorder drive mechanism, in combination, a first drive member rotatably mounted about a first axis, said first drive member having a substantially flat cylindrical drive surface, a second drive member rotatably mounted about a second axis parallel to said first axis, said second drive member comprising a pulley having a V-groove formed about its periphery, and an endless drive belt extending around said drive surface of said first drive member and around said pulley so as to be disposed in said V-groove, said endless drive belt being substantially square in its cross sectional configuration and being mounted so that one side of said belt lies substantially flat against said flat cylindrical drive surface and two sides of said belt engage against respective sides of said V-groove whereby said belt will assume approximately a 45 degree twist between said first drive member and said pulley and will provide a drive connection therebetween.

2. In a tape recorder drive system, in combination, a first drive member comprising a flywheel rotatably mounted about a first axis and having a capstan fixedly associated therewith for driving tape at a predetermined constant speed, the peripheral surface of said flywheel comprising a substantially flat cylindrical drive surface, a second drive member rotatably mounted about a second axis parallel to said first axis, said second drive member comprising a motor-driven pulley having a V-groove formed about its periphery, and an endless drive belt extending around the peripheral drive surface of said flywheel and around said pulley so as to be disposed in said V-groove, said endless drive belt being substantially square in its cross sectional configuration and being mounted so that one side of said belt lies substantially flat against said flat peripheral drive surface and two sides of said belt engage against respective sides of said V-groove whereby said belt will assume approximately a 45 degree twist between said flywheel and said motor-driven pulley and will provide a drive connection therebetween.

3. In a multi-speed tape recorder drive system, in combination, a first drive member comprising a flywheel rotatably mounted about a first axis and having a capstan fixedly associated therewith for driving tape at a predetermined constant speed, the peripheral surface of said flywheel comprising a substantially flat cylindrical drive surface, a second drive member rotatably mounted about a second axis parallel to said first axis, said second drive member comprising a stepped motor-driven pulley having a plurality of V-grooves formed in side-by-side relation at different diameters thereon, an endless drive belt extending around the peripheral drive surface of said flywheel and around said stepped pulley so as to be disposed in a selected one of said V-grooves, and speed changing means for shifting said endless belt from one of said V-grooves to another thereof, said endless drive belt being substantially square in its cross sectional configuration and being mounted so that one side of said belt lies substantially flat against said flat peripheral drive surface and two sides of said belt engage against respective sides of a selected one of said V-grooves whereby said belt will assume approximately a 45 degree twist between said flywheel and said stepped motor-driven pulley and will provide a variable speed drive connection therebetween.

References Cited by the Examiner

UNITED STATES PATENTS

| | | | |
|---|---|---|---|
| 151,948 | 6/1874 | Wood et al. | 74—229 |
| 164,002 | 6/1875 | Jewell | 74—233 |
| 1,648,178 | 11/1927 | Hull | 74—229 |
| 2,106,930 | 2/1938 | Nigra | 74—217 |
| 2,117,483 | 5/1938 | Lewellen et al. | 74—229 X |
| 2,718,154 | 9/1955 | Mathson | 74—220 |
| 3,131,529 | 5/1964 | Keyser | 74—219 X |

DON A. WAITE, *Primary Examiner.*